Patented Apr. 22, 1941

2,238,930

UNITED STATES PATENT OFFICE 2,238,930

TREATMENT OF EARTH FORMATIONS

Leonard C. Chamberlain and Harold A. Robinson, Midland, Mich., assignors to The Dow Chemical Company, Midland, Mich., a corporation of Michigan No Drawing. Application December 14, 1937, Serial No. 179,744

7 Claims. (Cl. 166—21)

The invention relates to methods of reducing the permeability of earth or rock formations. It more especially concerns an improved method of bringing about the formation of a plugging deposit within certain strata penetrated by the bore of an oil or gas well to prevent the infiltration of fluids thereinto.

The infiltration of certain fluids into a well bore is oftentimes undesirable, as for example, the infiltration of water into the bore of an oil or gas well. It has been proposed to prevent such infiltration by injecting under pressure into the water-bearing formation through the well bore a chemical solution which reacts with the formation waters, or with an equivalent aqueous solution previously introduced thereinto, to produce a deposit of a water-insoluble material in the pores of the formation. However, it is found in practice that such deposits do not permanently resist the displacing action of the ground water when the injection pressure is released and as a result the ground water which is often under great pressure again enters the well after a comparatively short time.

We have observed that the failure of such deposits to prevent water infiltration is due to the fact that the deposition of the plugging material occurs mainly in the face of the formation near the well bore where the water pressure gradient is the greatest. This premature precipitation not only prevents further penetration of the solution into the formation, but also prevents the deposit from being formed sufficiently deeply in the formation to be strongly held there by virtue of the greater holding power of the earth or rock more remote from the walls of the bore. Deposits produced deeply in the formation are subject to only a comparatively small water pressure gradient and are not readily displaced.

It is, therefore, an object of the invention to provide an improved method of sealing the flow passages or pores in the earth and rock formations penetrated by a well bore by the injection of a chemical solution forming a sealing precipitate in situ wherein the precipitation is so controlled as to permit the solutions to penetrate deeply into the formations before precipitation occurs. Still other objects and advantages of the invention will be apparent from the following description.

In the method contemplated by our invention, there is introduced into the well and thence into the formation to be treated a solution of a metal salt capable of forming an insoluble precipitate or deposit when the solution is brought into contact with alkaline materials, such as calcareous earth or rock of the well formation or alkaline well fluids, and together therewith an agent capable of raising the pH value at which such a precipitate normally begins to form. For convenience, such agent may be referred to as a "stabilizing agent." Such agents generally are organic compounds such as water-soluble organic acids and the like forming with the water-soluble metal salts soluble complex compounds having a relatively low degree of ionization. The formation to be treated, as already indicated, may itself be alkaline as when it is composed of, or contains, calcareous matter, such as limestone or dolomite, or when the formation waters carry dissolved alkaline constituents, such as alkali carbonates. In some instances, however, the formation may be substantially neutral or non-alkaline as when composed largely of siliceous materials as sand, for example. In the latter case, it is necessary to introduce into the formation an aqueous alkaline solution which is capable of bringing about precipitation of the metal salt solution.

Thus the invention contemplates broadly the treatment of any fluid permeable earth or rock formation surrounding a deep well into which formation the metal salt solution can be injected and there brought into contact with an alkaline material capable of bringing about the deposition of a water-insoluble precipitate by reaction therewith, a stabilizing agent being also introduced to prevent premature precipitation. The presence of the stabilizing agent has the effect of delaying the precipitation as well as raising the pH value at which precipitation occurs when the salt solution comes into contact with the alkaline material in the formation. Thus by virtue of the presence of a stabilizing agent, premature precipitation is prevented, thereby permitting the solution to be injected deeply into the formation before its pH value is raised to the point of precipitation by the alkaline material of the formation, or alkali material introduced thereinto for the purpose. Precipitation then occurs deeply in the formation away from the walls of the well bore. After the solution containing the metal salt and the stabilizing agent is injected and the precipitation has occurred, releasing the injection pressure does not result in the ground waters forcing the precipitate out of the formation as usually occurs when no stabilizing agent is used. The invention, then, consists of the method hereinafter fully described and particularly pointed out in the claims.

According to the invention, any water-soluble salt of a metal forming a water-insoluble precipitate when brought into contact with an alkali may be used, the precipitation of which is capable of being suppressed in its usual pH range by the presence of a stabilizing agent. For example, there may be used the water-soluble salts of antimony, bismuth, tin, cadmium, magnesium, zinc, aluminum, iron, manganese, cobalt, nickel, titanium, copper, mercury, silver, lead, and chromium. The water-soluble salts of these metals readily produce a precipitate of a basic metal compound when acted upon by an alkaline solution or when brought into contact with calcareous materials in the presence of water, whereby the pH value of the metal salt solution is raised to that of an aqueous suspension of the precipitated basic metal compound. Such metal salt solutions may be used in any desired concentration, such as from 1 to 20 per cent or more by weight, although a concentration of about 2 to 5 per cent is generally suitable.

The particular kind of stabilizing agent to use is chosen with reference to the specific metal salt solution employed so as to prevent the precipitation of the basic metal compound in its usual pH range. Specific examples of stabilizing agents suitable for the purpose are: lactic acid, ammonium acetate, glycine, glycollic acid, citric acid, maleic acid, and the like. Such compounds do not substantially alter any of the usual properties of the salt solutions when added thereto. For example, these stabilizing agents do not affect the surface tension of the metal salt solution so that it can be readily injected into the formation. However, these stabilizing agents not only delay the precipitation of the insoluble basic metal compound when the solution is brought into contact with an alkali, but also increase the pH value to which the metal salt solution must be raised to bring about precipitation, the increased pH value being materially above that required to cause such precipitation in the absence of a stabilizer.

The amount of stabilizing agent to use varies somewhat with the particular metal salt employed, as well as with the particular stabilizing agent selected, and the pH value at which it is desired to bring about precipitation. Ordinarily sufficient stabilizing agent is used to prevent a precipitate from forming until a pH value is reached that is slightly lower than that obtained when the metal salt solution is completely reacted with an alkali material of the type which will be present in, or introduced into the formation to be treated. In general, the most suitable way to determine the amount of the stabilizing agent to use is by a laboratory test. In carrying out this test, the pH value is first measured at which the reaction is substantially complete between the unstabilized metal salt solution, and an alkali material of the type which will be present in, or introduced into, the formation to be treated. After having determined the pH value at which precipitation occurs in the absence of a stabilizing agent, further tests are made in similar manner but with the addition of a stabilizing agent. This may be done by adding a known proportion of the stabilizing agent to the metal salt solution and then treating the solution with the alkali material and again measuring the pH value at which precipitation first occurs. This test is repeated with various amounts of stabilizing agent, if necessary, until the pH value at which precipitation first occurs is but slightly lower than that of the completely reacted unstabilized metal salt solution. By the foregoing procedure the proper proportions of stabilizing agent to use in a given case can be ascertained readily. A specific example will serve to illustrate this. When a 2 per cent solution of ferric chloride is treated with an alkali, a precipitate begins to form as soon as the pH of the solution reaches about 2.7, the pH further increasing to a value of about 5 when the reaction is complete. If similar tests are made in which there is added varying amounts of lactic acid and the pH value is measured at which precipitation first occurs in each case upon reaction with the alkali, it is found that about 1 per cent of lactic acid will prevent precipitation of the basic ferric compound until a pH of 4 is reached. Larger proportions of lactic acid still further increase the pH value at which precipitation first occurs. Since pH value of 4 is but slightly less than that of a completely reacted ferric chloride solution (pH 5.0), the solution is considered satisfactorily stabilized. Thus a 2 per cent solution of ferric chloride to which 1 per cent of lactic acid has been added will not form a basic precipitate when treated with an alkali until the pH of the solution has reached at least 4 instead of only 2.7 where no lactic acid is present.

The accompanying table sets forth a number of illustrative examples of metal salt solutions which may be used according to the invention. The table shows the concentration and kind of the metal salt in aqueous solution together with the pH value to which the solution must be raised when brought into contact with an alkaline material before precipitation normally begins. The table also shows the pH value at which precipitation begins in the presence of various percentages of a stabilizing agent, the amount of stabilizer being expressed as a percentage of the total weight of the metal salt solution employed. Thus by inspecting the table it will be seen that the precipitation by an alkali of a metal salt solution is suppressed by the addition of an organic stabilizing agent until the pH of the solution has reached a value very materially above that normally reached to effect such precipitation.

| Concentration of aqueous metal salt soln. | pH value at which precipitation begins | | Concentration of stabilizer in metal salt soln. |
|---|---|---|---|
| | Without stabilizer | With stabilizer | |
| 1% BiCl₃ | 0.5 | 13.0 | 18.0% citric acid. |
| 1% SnCl₂ | 1.5 | 6.0 | 25.5% lactic acid. |
| 4% SnCl₂ | 1.5 | 6.0 | 8.0% citric acid. |
| 1% SbCl₃ | 0.5 | 6.0 | 6.8% lactic acid. |
| 4% SbCl₃ | 0.5 | 6.0 | 8.0% citric acid. |
| 2% Fe(NO₃)₃ | 3.0 | 8.0 | 6.8% lactic acid. |
| 3% Fe(NO₃)₃ | 3.0 | 6.0 | 6.0% citric acid. |
| 1% Fe(NO₃)₃ | 3.0 | 6.0 | 20.0% acetic acid. |
| 1% Fe₂(SO₄)₃ | 4.0 | 7.0 | 5.1% lactic acid. |
| 1% Fe₂(SO₄)₃ | 4.0 | 10.0 | 5.0% citric acid. |
| 1% FeCl₃ | 2.7 | 6.0 | 3.4% lactic acid. |
| 2% FeCl₃ | 2.7 | 7.0 | 8.0% citric acid. |
| 2% FeCl₃ | 2.7 | 7.0 | 14.0% acetic acid. |
| 5% Al(NO₃)₃ | 5.1 | 7.0 | 5.0% lactic acid. |
| 10% Al(NO₃)₃ | 5.1 | 8.0 | 5.0% citric acid. |
| 2% Al(NO₃)₃ | 5.1 | 5.9 | 8.0% acetic acid. |
| 1% Al₂(SO₄)₃ | 2.0 | 6.0 | 5.1% lactic acid. |
| 1% Al₂(SO₄)₃ | 2.0 | 7.0 | 8.0% citric acid. |
| 1% Al₂(SO₄)₃ | 2.0 | 6.0 | 10.0% acetic acid. |
| 15% AlCl₃ | 3.8 | 7.0 | 18.0% lactic acid. |
| 10% AlCl₃ | 3.8 | 13.0 | 10.0% citric acid. |
| 1% AlCl₃ | 3.8 | 6.3 | 20.0% acetic acid. |
| 2% TiCl₃ | 3.0 | 6.5 | 10.2% lactic acid. |
| 1% TiCl₃ | 3.0 | 6.0 | 8.0% citric acid. |

The metal salt solutions listed in the table which form basic precipitates at a pH of 4 or less, readily precipitate when brought into contact with calcareous formations and also usually with the ground water present in such formations. Some metal salt solutions, such as those of the metals Zn, Cd, Mn++, Ni++, Cu++, Mg, Hg++, Ag, Co++, Fe++, Cr+++, however, require a greater degree of alkalinity to bring about precipitation than that obtainable with calcareous matter alone. In treating formations which are deficient in alkali such as sandstone formations and those not containing a sufficiently alkaline ground water as well as when the metal salt solution selected is not readily precipitated by the natural alkalinity of the formation, a suitable alkaline solution is injected into the formation either ahead of or after the metal salt solution to make up for such deficiency. For this purpose, solutions of sodium or potassium hydroxide and the alkali metal normal carbonates may be used.

In carrying out the method of the invention in an oil well, for example, the solutions may be introduced into the well and thence into the formation in various ways, depending upon the location of the formation to be treated. For example, to seal off water infiltration from a water-bearing stratum located above an oil-bearing stratum of a well provided with the usual casing and tubing, the casing not extending to the water-bearing stratum, it is preferable to first place a packer on the tubing and set it between the two strata. Any water or brine in the space above the packer is then forced back into the formation by oil or gas pressure. The metal salt solution and stabilizing agent are introduced into the well through the casing and pressure applied, if necessary to inject them into the formation. Because the pH value at which precipitation normally occurs is raised by the action of the stabilizing agent, a relatively large volume of the solution may be injected before any appreciable precipitation or plugging occurs. After the solution has been injected, the well is closed in and pressure maintained upon the solution, if necessary, to keep it in the formation while the reaction is taking place. The reaction is usually complete in about two to four hours after which the pressure may be released and the tubing, together with the packer, removed from the well. Any fluid standing in the well bore is then removed as by bailing and the well can then be put into production.

It is also to be understood that many of the metal salts, as well as the stabilizing agent, may be injected into the formation dissolved in a non-aqueous solvent instead of water. Such solvents may be either miscible or immiscible with water. When such solvents are used, precipitation can be delayed and prevented at the usual pH value only if the alkaline material causing precipitation is present in the formation in aqueous solution or if the formation contains water, whereby an aqueous alkaline solution could be formed. If desired, a non-aqueous solution of a base may be used to bring about precipitation in those cases where it is necessary to introduce an alkali to bring about the precipitation of the stabilized aqueous metal salt solution. If a non-aqueous stabilized metal salt solution be introduced into the formation and thereafter there be introduced a non-aqueous alkali, a charge of water should be introduced between the two solutions in order that dilution by water and stabilization may be brought about before precipitation occurs. Generally useful non-aqueous solvents for the metal salts are the alcohols, methyl and ethyl alcohol in particular, acetone, ether and glycol. Similar non-aqueous solvents are suitable for the alkalies.

The metal salts, when dissolved in non-aqueous solvents and in conjunction with a stabilizing agent, may be advantageously employed to shut off water without substantially affecting the flow of oil or gas into a well. In the methods heretofore proposed for selective "water shut-off" there is injected into the formation a non-aqueous chemical solution capable of reacting with constituents only of the water-bearing formation to produce a precipitate, such methods are not entirely satisfactory in all cases, due to the fact that most oil producing formations contain appreciable amounts of static water, or water which remains in the oil formation even when the well is being produced. Such water ordinarily so dilutes the non-aqueous chemical solution as to make it capable of reacting and forming a precipitate with the constituents of calcareous oil-bearing stratum. Some plugging of the oil-bearing pores, therefore, occurs. This difficulty can be overcome, however, by injecting a solution of stabilizing agent so that it becomes mixed with such static water before the non-aqueous metal salt solution is introduced into the formation. Precipitation then does not occur in the oil or gas-bearing stratum because the only water therein contains the stabilizing agent which prevents such precipitation from taking place.

In making a selective water shut-off treatment in a well in calcareous formations, the well being equipped with the usual casing and tubing, according to our improved method there is first injected into the formation a relatively concentrated aqueous or non-aqueous water-miscible solution of a stabilizing agent. In the oil-bearing formation, the stabilizing agent mixes with the static water contained therein, forming a solution therewith, and a similar solution of the stabilizing agent is formed also in the water-bearing formation. The well is then produced for a time sufficient to practically completely flush the solution of the stabilizing agent from the water-bearing formation, while the stabilizing agent contained in the static water in the oil formation does not flow into the well during production as readily as the oil, but remains behind in the formation. After producing the well, any water standing in the well bore is preferably removed, as by swabbing the well through the tubing, and the space occupied by the water is filled with oil introduced into the well through the casing as the process of swabbing the well progresses. The well, thus filled with oil, is ready for treatment with a non-aqueous metal salt solution. This solution is introduced into the well, preferably through the tubing, and the oil contained therein being displaced upward into the casing and allowed to flow therefrom until the solution fills the well bore up to the top of the formation to be treated. The casing is then closed in and the metal salt solution, either with or without additional stabilizing agent, is forced into the formations by applying a pressure, such as oil or gas pressure. Dilution with water in the formation then occurs and a deposit of a basic metal compound is produced in the water-bearing stratum. At the same time the non-aqueous metal salt solution that enters the oil-bearing formation and becomes diluted by the static water does not form a precipitate, because the stabilizing agent already present therein prevents precipitation at the pH value reached by the reaction of the diluted non-aqueous metal salt solution and constituents of the oil-bearing calcareous formation.

This method may be slightly modified and effectively used for selective water shut-off in any non-calcareous water-producing formation. For example, the solution of the stabilizing agent is injected, the well is produced, and the water boiled or otherwise removed therefrom as before. Thereafter there is introduced into the well, preferably through the tubing as previously described, the non-aqueous solution of the metal salt, either with or without additional stabilizing agent, and together therewith a material which is capable, upon dilution with water, of forming an active alkali. Thereafter pressure is applied, as by pumping oil in the tubing, to force the solution into the formations. Such solutions, capable of forming an active alkali, may be introduced with the non-aqueous metal salt solution, or if desired, the solution of inactive alkali may be introduced separately; for example, an ethyl alcohol solution having dissolved therein dimethyl amine or trimethylamine, which will not form a precipitate with a non-aqueous solution of the metal salts listed, may be used. Upon dilution with water, an active alkali is formed which is capable of producing a precipitate with the metal salt solution. The solution penetrating the oil formation is not precipitated by the action of static water, due to the presence therein of the stabilizing agent retained by it, while in the water-bearing formation an effective seal is produced.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of treating an earth or rock formation to produce a precipitate in the pores thereof by reacting therein a solution of a water soluble metal salt with an alkaline material, the step which consists in introducing into the said pores a stabilizing agent capable of preventing the precipitation at the usual pH value of such precipitation.

2. In a method of treating an oil or gas well in a calcareous formation, the step which consists in introducing into the well and thence into the formation a solution of a metal salt capable of forming a precipitate by reaction with calcareous matter and a stabilizing agent capable of preventing the formation of the precipitate at the usual pH value of such precipitation.

3. In a method of treating an oil or gas well in a calcareous formation which delivers water into the well from a stratum separate from that delivering oil or gas, said oil or gas stratum containing static water, to reduce the flow of water into the well without substantially reducing the flow of oil, the steps which consist in introducing into the well and thence into the formation a water-miscible solution of a stabilizing agent, whereby in the oil or gas-bearing stratum the said agent becomes mixed with the static water and in the water-bearing stratum with the water therein, thereafter producing the well, whereby the said agent is flushed out of the water-bearing stratum but retained in the static water in the oil or gas stratum, and then introducing into the well and thence into the formation a water-miscible solution of a metal salt capable of forming a precipitate of a basic compound by reaction with calcareous matter in the presence of water and together therewith a quantity of a stabilizing agent, whereby the precipitation of the basic compound is delayed in the water-bearing stratum beyond the pH value at which such precipitation occurs in the absence of a stabilizing agent and substantially prevented in the oil or gas-bearing stratum by the stabilizing agent already present therein in the static water.

4. In a method of treating an oil or gas well in a non-calcareous formation which delivers water into the well from a stratum separate from that delivering oil or gas, said oil or gas stratum containing static water, to reduce the flow of water into the well without substantially reducing the flow of oil, the steps which consist in introducing into the well and thence into the formation a water-miscible solution of a stabilizing agent, whereby in the oil or gas-bearing stratum the said agent becomes mixed with the static water and in the water-bearing stratum with the water therein, thereafter producing the well, whereby the said agent is flushed out of the water-bearing stratum but retained in the static water in the oil or gas stratum, and then introducing into the well and thence into the formation a non-aqueous water-miscible solution of a metal salt capable of forming a precipitate of a basic compound by reaction with an aqueous alkaline material, said water-miscible solution containing a substance which, upon dilution with water, forms an active alkaline material, and together therewith a quantity of a stabilizing agent, whereby the precipitation of the basic compound is delayed in the water-bearing stratum beyond the pH value at which such precipitation occurs in the absence of a stabilizing agent and substantially prevented in the oil or gas-bearing stratum by the stabilizing agent already present therein in the static water.

5. In a method of treating an oil or gas well in a non-calcareous formation which delivers water into the well from a stratum separate from that delivering oil or gas, said oil or gas stratum containing static water, to reduce the flow of water into the well without substantially reducing the flow of oil, the steps which consist in introducing into the well and thence into the formation a water-miscible sodium of a stabilizing agent, whereby in the oil or gas-bearing stratum the said agent becomes mixed with the static water and in the water-bearing stratum with the water therein, thereafter producing the well, whereby the said agent is flushed out of the water-bearing stratum but retained in the static water in the oil or gas stratum, and then introducing into the well and thence into the formation a non-aqueous water-miscible solution of a metal salt capable of forming a precipitate of a basic compound by reaction with an aqueous alkali, said water-miscible solution containing a substance which, upon dilution with water, forms an active alkaline material, whereby precipitation of the basic compound occurs in the water-bearing stratum, and is substantially prevented in the oil or gas-bearing stratum by the stabilizing agent already present therein in the static water.

6. In a method of treating an oil or gas well in a calcareous formation, the step which consists in introducing into the well and thence into the formation a solution of a water-soluble inorganic ferric compound and a quantity of a stabilizing agent.

7. In a method of treating an oil or gas well in a calcareous formation, the step which consists in introducing into the well and thence into the formation a solution of a water-soluble inorganic ferric compound and a quantity of lactic acid.

LEONARD C. CHAMBERLAIN.
HAROLD A. ROBINSON.

CERTIFICATE OF CORRECTION.

Patent No. 2,238,930. April 22, 1941.

LEONARD C. CHAMBERLAIN, ET AL.

It is hereby certified that error appears in the printed specification of the above numbered patent requiring correction as follows: Page 2, second column, line 66, seventeenth item in the first column of the table, for "1% $Al_2(SO_4)$" read --1% $Al_2(SO_4)_3$--; page 4, first column, line 10, for "boiled" read --bailed--; same page, second column, line 52, claim 5, for "sodium" read --solution--; line 64, same claim, for the word "alkali" read --alkaline material--; and that the said Letters Patent should be read with this correction therein that the same may conform to the record of the case in the Patent Office.

Signed and sealed this 1st day of July, A. D. 1941.

(Seal)

Henry Van Arsdale,
Acting Commissioner of Patents.